(12) United States Patent
Pappo et al.

(10) Patent No.: US 10,542,009 B2
(45) Date of Patent: Jan. 21, 2020

(54) SYSTEM AND METHOD FOR DATA TRANSFER AUTHENTICATION

(71) Applicant: EXSHAKE LTD., Haifa (IL)

(72) Inventors: Nicky Pappo, Haifa (IL); Shmuel Kulikin, Haifa (IL)

(73) Assignee: Sonarax Ltd, Haifa ( * ) Notice: Subject to any disclaimer, the term of this patent is extended or adjusted under 35 U.S.C. 154(b) by 480 days.

(21) Appl. No.: 15/027,710

(22) PCT Filed: Oct. 7, 2014

(86) PCT No.: PCT/IL2014/050880
§ 371 (c)(1),
(2) Date: Apr. 7, 2016

(87) PCT Pub. No.: WO2015/052712
PCT Pub. Date: Apr. 16, 2015

(65) Prior Publication Data
US 2016/0248779 A1    Aug. 25, 2016

Related U.S. Application Data

(60) Provisional application No. 61/887,465, filed on Oct. 7, 2013, provisional application No. 61/935,364, filed on Feb. 4, 2014.

(51) Int. Cl.
*H04L 29/06* (2006.01)
*G06Q 20/20* (2012.01)
(Continued)

(52) U.S. Cl.
CPC ........... *H04L 63/102* (2013.01); *G06Q 20/20* (2013.01); *G06Q 20/3224* (2013.01);
(Continued)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS

| 2007/0244586 A1* | 10/2007 | Champion | .............. G06F 3/165 |
| | | | 700/94 |
| 2011/0182445 A1* | 7/2011 | Atsmon | .................... A63H 3/28 |
| | | | 381/123 |

(Continued)

FOREIGN PATENT DOCUMENTS

NL    2008646    10/2012

*Primary Examiner* — Farid Homayounmehr
*Assistant Examiner* — Sharif E Ullah
(74) *Attorney, Agent, or Firm* — Reches Patents

(57) ABSTRACT

A transaction initialization system serving first and second devices, interconnected by a communication network, each having a speaker and a microphone, which wish to perform a transaction, the system comprising a server; and a client which controls the first device to initiate the transaction by (a) commanding the first device's speaker to generate a transaction-heralding sound and by (b) notifying the server, via said network, of generation of the transaction-heralding sound; and controls the second device, using a processor, to notify the server, via said network, that a particular transaction-heralding sound has been heard; and wherein, at least once, when the server notes that the same transaction-heralding sound has been reported as having been sent and as having been received, the server responsively validates a transaction between the two devices.

20 Claims, 6 Drawing Sheets

(51) Int. Cl.
*G06Q 20/38* (2012.01)
*G06Q 20/32* (2012.01)
*G06Q 20/40* (2012.01)
*H04L 29/08* (2006.01)

(52) U.S. Cl.
CPC ....... *G06Q 20/3272* (2013.01); *G06Q 20/387* (2013.01); *G06Q 20/401* (2013.01); *H04L 67/306* (2013.01); *H04L 67/42* (2013.01)

(56) References Cited

U.S. PATENT DOCUMENTS

| | | | |
|---|---|---|---|
| 2013/0029646 A1* | 1/2013 | Chowdhury | G06Q 20/22 455/414.1 |
| 2013/0179336 A1* | 7/2013 | Lyons | G06Q 20/30 705/39 |
| 2014/0188487 A1* | 7/2014 | Perez Gonzalez | G10L 25/18 704/500 |
| 2014/0188646 A1* | 7/2014 | Itwaru | G06Q 20/202 705/21 |

\* cited by examiner

SYSTEM AND METHOD FOR DATA TRANSFER AUTHENTICATION

CROSS-REFERENCE TO RELATED APPLICATIONS

This is the U.S. National Stage of International Application No. PCT/IL2014/050880, filed Oct. 7, 2014, which was published in English under PCT Article 21(2), which in turn claims the benefit of US provisional application Nos. 61/887,465 (filed 7 Oct. 2013) and 61/935,364 (filed 4 Feb. 2014), entitled respectively "Method of Exchanging Data between Mobile Devices Based on Ultrasonic Frequencies" and "Method of Delegation between Services and Device/s in Order to Perform Certain Tasks".

FIELD

The present invention relates generally to communication between electronic devices and more particularly to transfer of data from one networked device to another.

BACKGROUND

Conventional technology is described e.g. here:
1. U.S. 2012/214,416(A1)—Methods And Apparatuses For Communication Between Devices
2. U.S. 2013/265,857(A1)—Device Association
3. U.S. 2009/156,202(A1)—Methods, Apparatus And Systems For Information Exchange Using Portable Electronic Devices
4. U.S. 2007/234,048(A1)—Session Handover Between Terminals
5. U.S. 2013/122,810(A1)—Device Association
6. U.S. 2010/278,345(A1)—Method And Apparatus For Proximity Based Pairing Of Mobile Devices
7. U.S. 2003/212,549(A1)—Wireless Communication Using Sound
8. U.S. Pat. No. 8,275,315(B2)—System And Method For Transmitting Data Over An Audio Communication Link.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system allowing a user to interact with multiple service providers, the system comprising: a population of Service providers each of which is operative to transmit to a user's data manipulation Device a request for user-specific data that the service requires in order to provide the service to the User; and a population of data manipulation Devices each of which stores user-specific data, specific to an individual user, that a plurality of service providers from among said population thereof each require in order to provide respective services to the individual User and wherein each of said devices, responsive to respective receipt of requests for said data from at least first and second service providers, transmits said data to said at least first and second service providers respectively. Typically, at least some of said service providers comprise email accounts, and said user-specific data comprises login information.

Certain embodiments of the present invention seek to provide a method for using external Device/s such as smartphones or other mobile e.g. cellular communication Device/s to perform tasks in conjunction with Service providers such as websites. A Service or task may for example comprise a login process, purchasing an item from a website, receiving data such as emails and, many other Services typically conducted as a session between Service providers and Service Consumers (users).

Conventionally, interaction between a User and a Service provider is conducted using traditional input devices such as a keyboard and/or mouse and/or touch screen to provide a user's input including fixed particulars regarding the user such as User name, password, email which may be inputted repeatedly to various service providers. An example of an interaction or session is a User that wants to login to a Service provider in order to receive some type of private data. The Service provider prompts the User with a login page, in which the User enters his or her User name and/or password and/or other user-specific data that is required for the Service provider to identify the User. Once the User enters valid data specific to her or him, the Service provider grants him access to the private data or service. Another example may be Service provider/s that manage/s the purchasing process of merchandize for Users e.g. e-commerce site, vending machines, automatic ticketing kiosks. In this case, the User selects the items that he or she wishes to purchase, and proceeds to a typically virtual checkout process. There the User again needs to enter all the information required by the Service provider to complete the transaction: his or her address, phone, credit card number, etc. although this same information may already have been provided during previous log-in.

These processes require significant and lengthy interaction on the part of the User; this can also be subject to errors that may stop the Service to the User. Moreover, the Service provider receives information such as credit card numbers that can violate the privacy and security of the User. But certain embodiments of the present invention eliminate these processes.

According to certain embodiments, a transaction initialization system and method are provided for serving first and second devices, interconnected by a communication network, each having a speaker and a microphone, which wish to perform a transaction, the system comprising
 a server; and a client which controls the first device to
  initiate the transaction by (a) commanding the first device's speaker to generate a transaction-heralding sound and by (b) notifying the server, via said network, of generation of the transaction-heralding sound; and
  controls the second device, using a processor, to notify the server, via said network, that a particular transaction-heralding sound has been heard; and wherein, at least once, when the server notes that the same transaction-heralding sound has been reported as having been sent and as having been received, the server responsively validates a transaction between the two devices.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to steps of flowcharts, may be performed by at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet. Any such connection between these devices, may need authentication e.g. that one device knows and approves of the other device and vice versa.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where-ever suitable operate on signals representative of physical objects or substances.

The embodiments referred to above, and other embodiments, are described in detail in the next section.

The present invention may be described, merely for clarity, in terms of terminology specific to particular programming languages, operating systems, browsers, system versions which is not intended to limit the scope to same.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably, e.g. a user may configure or select whether the element or feature does or does not exist.

Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Any of the functionalities herein may be divided between a server computer and client computers.

The following terms may be construed either in accordance with any definition thereof appearing in the prior art literature or in accordance with the specification, or as follows:

Service provider—A virtual or physical entity, such as websites or even a physical gate, car, or other physical service provider that perform certain tasks or services on behalf of users. For instance, a user seeks to visit a secure website that performs a certain service such as transferring money from her account to another account. Or a user seeks to enter her or his car. The car needs to "know" that this user is allowed to enter the car.

User—An entity that consumes e.g. benefits from a Service e.g. a User that logs into a website, or a human user of a physical device or a sensor or user thereof.

Device (aka data manipulation device)—any computer, mobile device, phone or processor that can receive and send data and perform certain computational operations.

BRIEF DESCRIPTION OF THE DRAWINGS

Certain embodiments of the present invention are illustrated in the following drawings.

Figure 1:
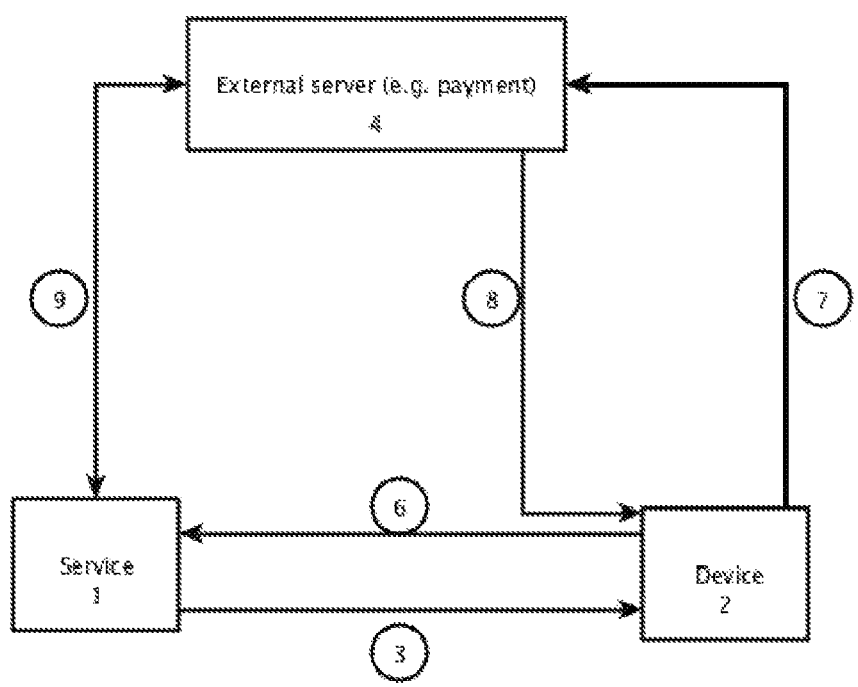
FIG. 1 is a simplified block diagram illustration of data transfer between Devices and a Service provider in accordance with an embodiment of the present invention.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's steps, including a mobile application, platform or operating system e.g. as stored in a medium, as well as combining the computer program with a hardware device to perform some or all of the steps of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, first and second networked devices (e.g. smart phones, computing devices, or even web pages), each having a speaker and/or a microphone, wish to perform a transaction e.g. to transfer pictures or electronic payment or a person's or corporation's contact particulars or a coupon or other entitlement or password or key or any other electronic commodity or data from one to the other and wish to identify or authenticate each other as the sender and recipient for this transaction, respectively. The devices are close enough to hear sounds generated by one another. One (the first) device initiates the transaction by commanding its speaker to generate a transaction-heralding sound which may for example be within the ultrasonic spectrum. The first device also notifies a server, via Internet or any other suitable communication network, of the transaction-heralding sound. Typically, the server is pre-programmed to accept notifications that individual devices have sent a transaction-heralding sound. For example, if each transaction-heralding sound is a superposition of 4 frequencies as described below, the server may be pre-programmed to accept a notification of the 4 frequencies, in Hz (say: 17000, 17400, 18200, 19900).

Any other device within hearing range, including the second device, notifies the server, also via Internet or any other suitable communication network, that this particular transaction-heralding sound has been heard.

Typically, each device can be placed, e.g. by the app governing the desired transaction or by the server, into an active mode as opposed to a normal, standby mode. In the active mode, a device which is waiting to receive data via a particular transaction is pre-programmed to scan incoming sound in a search for a sound having the known "profile" of a transaction-heralding sound. The transition between passive mode and active mode may for example be effected by user command (e.g. by pressing a button) or may be triggered automatically, e.g. once a certain frequency or sound is heard. Typically, then, 3 stages are provided: Inactive (microphone is not active to receive any sound), standby (microphone is standing by to receive certain frequency but not others) and active. Provision of a standby mode is useful to save computational power hence device battery. The profile may be a superposition of a pre-known plurality (say, 2 or 3 or 4 or 5 or more) frequencies and incoming sound is deemed to meet that profile if n (e.g. 1 or . . . 4 or . . . 10 or more) frequency peaks are detected, using suitable digital signal processing (as opposed to run-of-the-mill conversations, music and background noise which do not meet this profile). Peaks are typically deemed to have occurred if a hump-shape is detected whose maximum exceeds a pre-programmed threshold. Each time the device (is put into active mode and) detects an incoming sound that meets the profile, the device typically determines the n peaks as an output of the digital signal processing and conveys their values to the server which is pre-programmed to accept these. For example, a listening (second) device may report to the server that the second device's microphone has just heard the following 4 frequencies, in Hz: 17200, 17700, 18200, 18900.

When the server notes that the same transaction-heralding sound has been reported as having been sent and as having been received, the server then opens a transaction, over which the two devices may transfer whatever data they wish, using any suitable protocol, and notifies the two devices accordingly, unless there is reason to disallow (invalidate) the transaction e.g. some or all of the following:

a. more than one devices report that their respective speakers have generated the same transaction-heralding sound within a first pre-programmed time interval such as, say, 1-2 seconds.
  b. more than one devices report that their respective microphones have received the same transaction-heralding sound within a second pre-programmed time interval such as, say, 1-2 seconds.
  c. only one device reports generating a particular transaction-heralding sound and only one device reports having received the same transaction-heralding sound, but the 2 reports are separated by a time interval which exceeds a third pre-programmed time interval which may or may not be equal to the first and/or second intervals, such as, say, 1-2 seconds.
  d. Each device provides the server with a pre-assigned app-ID. For example, if the transaction is being effected in the context of TenLeeImage's image-exchange app, each device may be given, by the TenLeeImage's image-exchange app, the TenLeeImage's app-ID namely 2573. At a certain window of time e.g. 1-2 seconds, only one device reports generating a particular transaction-heralding sound and only one device reports having received the same transaction-heralding sound, but the app-IDs of the two devices are not the same (the 'hearing device' is not operating in the context of TenLeeImage's image-exchange app hence does not send the server an app-ID of 2573) and/or do not "match" according to app-ID matching tables pre-stored at or otherwise accessible to, the server. For example, the 'hearing device' sends the server an app-ID of 2574, but the server's app-ID matching tables indicate that app 2574 is not supported by TenLeeImage's image-exchange app.

Typically, the first device generates (e.g. randomly) a different transaction-heralding sound for each transaction the first device wishes to effect. Each transaction-heralding sound typically comprises n superimposed frequencies wherein n is a predetermined integer between say 1 and 10. Each frequency is located within one of N slots into which the total spectrum is partitioned. The slot width may be selected by calibration during a set-up stage. If for example it is not desirable for a frequency of 17350 Hz to be considered as 17360 Hz (e.g. due to expected idiosyncrasies of signal processing), the slot is selected to be large enough to prevent this. For example, slot size may be 10 Hz, 30 Hz, 50 Hz or any other suitable value depending on the application.

For example, if the total spectrum is the 17 k-20 k Hz ultrasonic spectrum and N=300, the 300 slots may be 17000-17010 Hz, 17010-17020 Hz, . . . 19990-20000 Hz. Then, if n=4, the transaction-heralding sound may for example comprise a superposition of the following 4 frequencies: 17000, 18000, 18050, 19070. If another device reports hearing a superposition of the following 4 frequencies: 17003, 18004, 18051, 19072, the server may deem both devices to have respectively generated and heard the same transaction-heralding sound.

Figure 7:
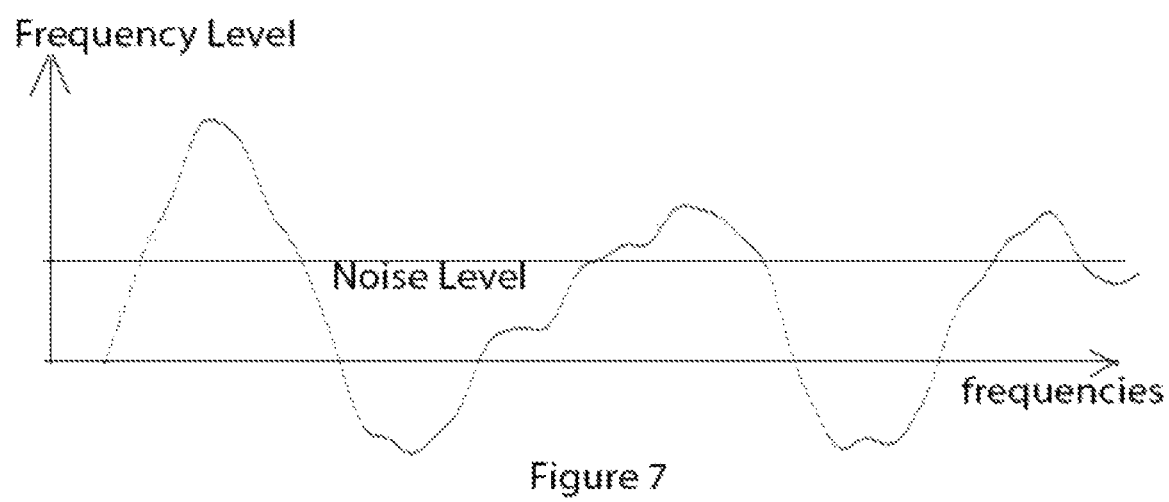
FIG. 7 is an amplitude-frequency graph useful for understanding certain embodiments.

Any suitable technology may be employed to process incoming sound so as to distinguish frequencies therewith. For example, as shown e.g. in FIG. 7, according to certain embodiments, frequencies may be identified which are above a predefined noise level. The noise level is indicated in FIG. 7 by a horizontal line intermediate the 70 dB and 80 dB amplitude levels; it is appreciated that the particular noise level illustrated in FIG. 7 is merely by way of example and is not intended to be limiting. The noise level may be pre-computed when no peak frequencies are observed. Once a frequency peak is observed which exceeds than the noise level x (parameter—e.g. 3) times, the frequency may be deemed valid e.g. defined as a peak. To find the frequencies Fourier Transform techniques may, by way of example, be employed, or other conventional techniques.

n and N may be selected in any suitable manner taking into account practical considerations such as the number of unique transaction-heralding sounds which the server needs to support; in the above example, 300×300×300×300 unique transaction-heralding sounds are possible.

It is appreciated that data may be sent without server involvement. For example, assume that the spectrum 17000-20000 Hz is partitioned into 100 slots of 30 Hz each. Each frequency may have 25 slots in which case 25*25*25*25=390625 numbers may be sent e.g. by converting to: $ax25^3+bx25^2+cx25^1+d$. For example, if the number 180000 is received, the number itself (18000) may be sent for a time period of length x (e.g. 0.1 sec), and then nothing (blank signal) may be sent for another time period of length x, and finally a number which is complementary to 180000 (yielding 390625 i.e.) may be sent.

The sending or receiving device may even be a web-page, in which case Javascript implementing a suitable engine may be incorporated into the web-page's html characters. The engine may for example be operative, responsive to a suitable trigger such as pressing a virtual button on the web-page, to command the speaker of a personal computer which has downloaded the web-page, to emit a suitable transaction-heralding sound. The engine is also operative to report to the server, any transaction-heralding sounds heard by the microphone of the personal computer which has downloaded the web-page.

According to certain embodiments, e.g. as shown in FIG. 1, a Service provider transmits to Device/s (e.g. a mobile Device) credentials and information that the service require/s from the User. For instance the Service provider may need to make sure that this is an authorized User to enter in a Service login. Another example is that the Service provider may need to receive from the User the amount of money that he or she needs to pay in order to complete his or her purchase. The Device contains all this relevant information for an individual user and sends back to the Service provider whichsoever data is needed in order to complete the operation. If an additional Service e.g. payment is to be executed, this can also be done from the Device. In the end of this process the Device sends the result of this process to the Service provider. Which means—the task has been completed or not.

According to certain embodiments, the Device is a sub-Service to the main Service which performs operations on the main Service's behalf and sends back the operations' results.

An advantage of certain embodiments is that the Device contains all the data needed for certain operations that can be utilized towards many Services. For instance User names and passwords for one or more Services. For instance, if the user needs to enter into several email accounts, he or she may do so automatically from the Device without typing login information or other user specific information which can be useful for one or more services. In a payment process specifically, since the Device holds the payment methods such as credit card number, the Service provider may not have this data. The sensitive data is stored only on the Device and not spread around in different Service providers. The result is that the security and ease of use are enhanced.

FIG. 1 shows an example process of exchanging Data between the Service provider 1 and Device 2.

Typically, a Service is requested by the User. For instance, the User asks to open a document. The Service provider 1 needs to authenticate this User.

Service provider 1 sends a user authentication request for user authentication data to the Device 2. The request has a Request ID that may be valid for the entire process. The process of transmitting this information is described in the figure as 3. This transmission can be executed in many ways: Ultrasonic waves, Wireless information, Optic waves and any other means of transferring data. Once the Device 2 receives the request, Device 2 begins to react in order to fulfill this request. Device 2 might have all the needed information towards this goal. For instance, the identity of the User may be stored in memory of device 2. In this case device 2 may send back this information to the Service provider 1 via line 6. This answer might be for instance User name and password. The Service provider 1 receives this information and provides or denies the User access to the Service. The same Device 2 might, subsequently, use another Service provider (one or more) to perform additional tasks e.g. to perform a payment transaction. In this case the Device 2, sends a request to an External Service provider 4 with the payment transaction details and/or other needed data. This data request transmission is marked '7' in FIG. 1. The External Service provider 5 may perform this task and may send the result in one of these ways—either may notify Device 2 of the result (this is shown in the figure '8'). The Device 2 may send back this result back to the Service provider 1.

Another method to notify about the success may be to update the External Service provider 4's database and or a file system. The Service provider 1 may poll the External Service provider 4 about the success of the operation (yes/no). In this case, if the payment transaction was completed successfully or not. In the first case, service provider 4 typically executes the transaction, and in the latter case service provider 4 typically sends some form of notification to the User.

Figure 2:
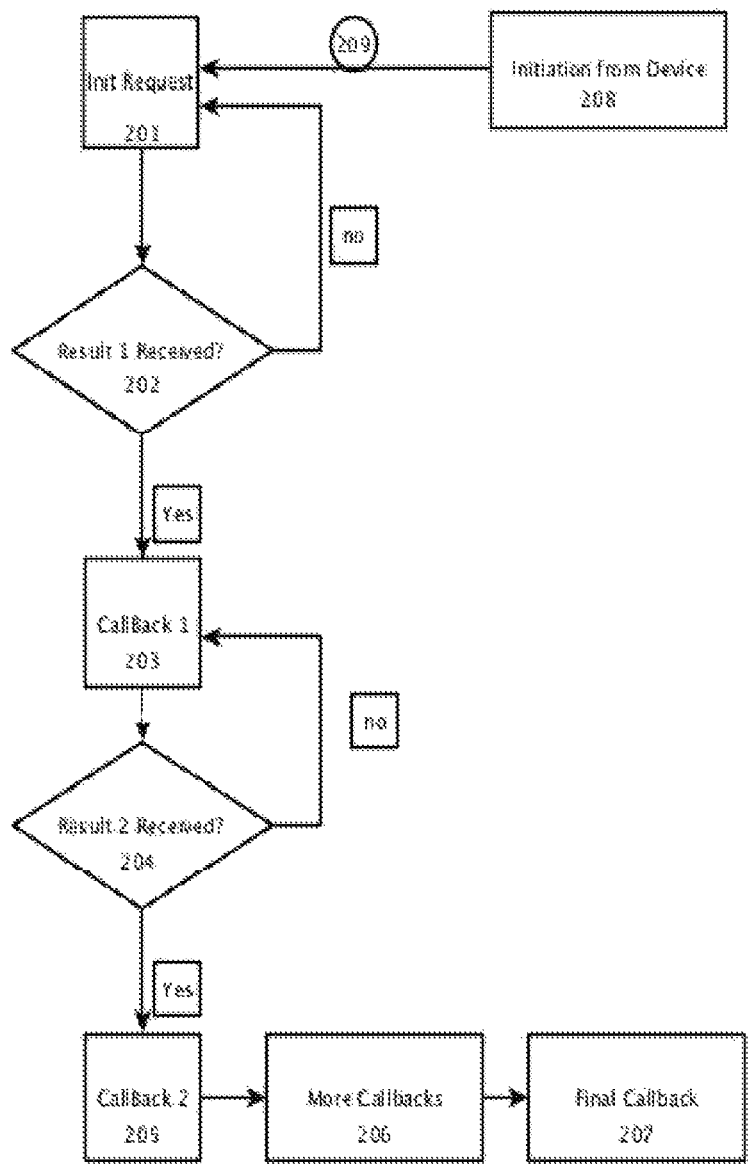
FIG. 2 is a simplified flowchart illustration of a method of operation performed by a Service provider in accordance with an embodiment of the present invention.

FIG. 2 illustrates a process performed by a Service provider (not shown). The process starts by initiating a request '201' such as a Login. This initiation can be initiated by the User (for instance pressing a virtual button on a website), or automatically as a result of some event (for instance a sensor detects movement around the Service This initiation can alternatively be commenced from a Device 208 via initialization 209 e.g. pressing a button on the Device to let the User enter into the Service provider. In this embodiment the Service provider "polls" (sends a request) to the Device e.g. as described in FIG. 1. Then the Service provider waits for results (1 or more). The waiting process is something that can be configured according to the specific task. For instance the delay between polls can be, say, 100 milliseconds or any other suitable typically predetermined interval. The Service provider waits (box 202) for the first result. If the result is no, the method of FIG. 2 goes back to box 201. "Yes" means a valid result. In this case the Service provider may execute a callback operation 3 e.g. notify the User that the authentication has been successful. Then, the Service provider may (or not) wait for one or more results. Boxes number 4 and 5 illustrates a second callback. For instance, the Service provider may receive a notification that the payment transaction has been completed. The Service provider may perform another operation as a result of this notification e.g. notify the User, or open a gate. Then the Service provider may wait for more results and callbacks (Box 206).

Once the final result has been received (box 7), the Service provider may make the final operation (for instance, notify the User that the transaction has been processed successfully).

Figure 3:
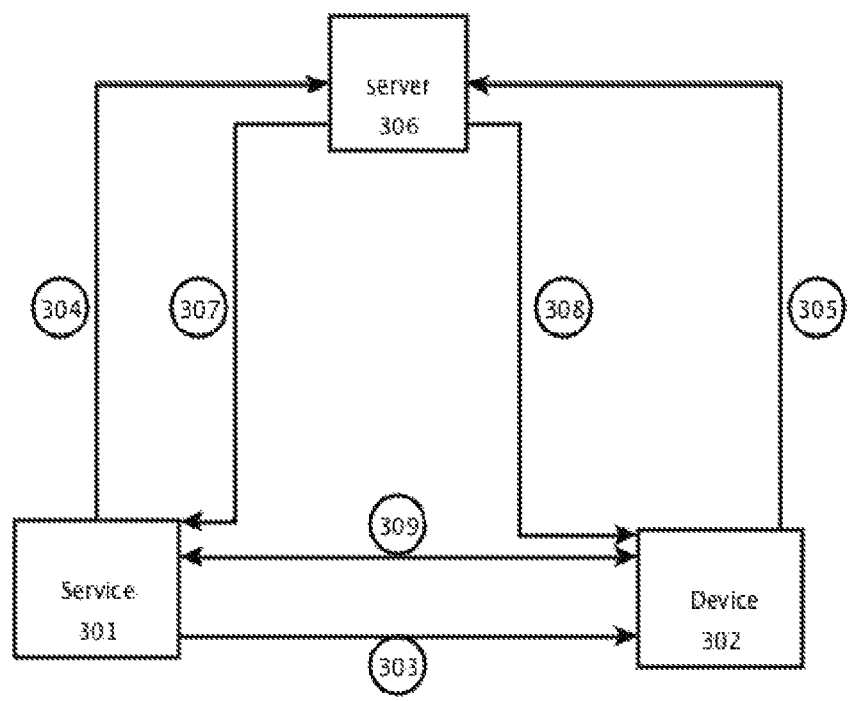
FIG. 3 is a simplified block diagram illustration of a hand-shake between Devices and a Service provider in accordance with an embodiment of the present invention.

FIG. 3 shows the process of a handshake between the Service provider and the Device.

The Service provider 301 initiates some random or other signature A that is related to one of service provider 301's sensors. For instance signature A may hold or include a series of audio frequencies or a series of optic frequencies Device 304 detects signature A using its sensors. For instance audio signatures may be detected by the Device's microphone, whereas an optic signature may be detected by the device 304's camera. service 301 sends detected signature B to a server 306 via line 304, and Device 302 sends the signature B to service provider 301. The Server 306 identifies that the initiated signature A is similar to the detected signature B. Once this identification is successfully done, the Server 306 notifies the Service provider 301, via handshake 9, that he can send or receive data from Device 302.

It is appreciated that the embodiments of FIGS. 1-3 which assume that device/s exchanging data are web-pages, are not intended to be limiting. More generally, e.g. as described below with reference to FIGS. 4-7, the devices may be any pair of networked devices having the capacity to transmit and receive sound e.g. at ultrasonic frequencies.

An example method of exchanging data between mobile devices based on ultrasonic (say) frequencies is now described with reference to FIGS. 4-7. The method facilitates exchanging data between mobile and stationary devices such as mobile devices, tablets, and PCs that may have conventional speakers and microphones. It is appreciated that each device whether stationary or mobile may have a speaker and microphone used for many applications.

The method may employ an application, or an API for other applications. Each device, once activated, typically transmits at least one random (say) frequency from its speaker. The other device detects the frequency or frequencies. Typically but not necessarily, each device has its own vector of frequencies which comprises or consists of its own frequency and the frequency the device detected. The vector is typically transmitted to a server. If the server finds a correlation between the two devices e.g. based on these vectors, the server transmits back the desired data. A particular advantage of certain embodiments is that while conventional devices are capable of sending information from one device to the other via various technologies such as but not limited to Bluetooth, Wi-Fi, NFC, and QR, these technologies are not accepted widely by users inter alia because the process of sending information is expected by users to be very fast whereas in fact, the current processes require significant user input hence are slow and cumbersome. Consequently, users may be found, say, transferring contact information by paper such as business cards or manually typing information such as a phone number or email address in order to identify another device.

Not only does this type of process which requires significant user actions, consume time, the process is also subject to human errors (e.g. mistyping email addresses and in some cases requires special hardware such as NFC which is not supported by all operating systems.

The device mechanism (e.g. SDK—Software Development Kit) may be installed inside other applications in advance. Initial operation of the SDK (say) by the user may be to invoke the application in which the SDK is embedded. Alternatively, the SDK can also be preinstalled in the operating system of the device (e.g. Android or IOS) in which case any application can use the SDK. Any application that uses the SDK typically initiates the SDK by several parameters, and defines what Data to transfer to another mobile device. Other parameters define general behaviors of the SDK such as sounds clips whenever Data arrives.

2 operation modes of the SDK are also typically defined in the initial parameters:

Active mode: the application transmits Data and also Frequencies.

Standby: the application only listens to Frequencies. Typically, only upon receipt of predetermined frequency profile will the application then transmit its own Frequencies.

Figure 4:
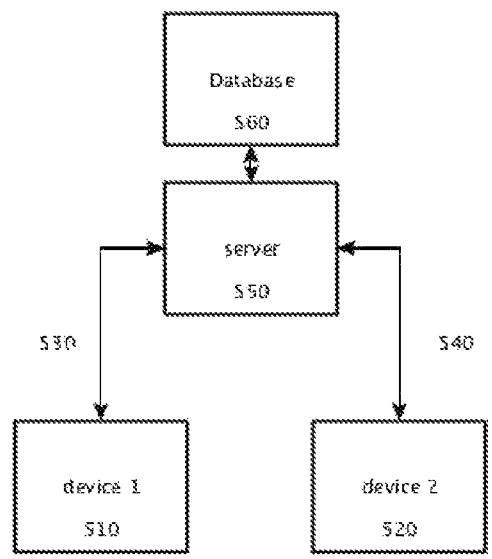
FIG. 4 illustrates data transfer between devices and server according to certain embodiments.

FIG. 4 shows the process of exchanging Data between two devices 510, 520.

Devices 510, 520 can, typically, be in Active or in Standby mode. They transmit one or more frequencies. By the end of the process each of the devices may, according to certain embodiments, have a vector of sampled Frequencies (Herein "vector"). Generating the Vector may be as described later with reference to FIG. 5. Once Vectors are generated by the devices 510, 520 the vectors may be sent to an external Server 550 as indicated by lines 530, 540 which may denote any kind of network communication (such as but not limited to HTTP requests). Server 550 typically receives multiple vectors from many devices such as 510, 520. The process of determining which vectors correspond to (correlate with) which may for example include some or all of the operations illustrated in FIG. 6, suitably ordered e.g. as shown.

Once this correlation is detected (herein Correlation), the server 550 sends back the Data to the devices requesting the desired information e.g. by communication methods 530, 540. Once this Data reaches the devices (e.g. device 510 receives the information from device 520 and/or vice versa) this Data can be processed by the devices (e.g. if a contact card, the contact data may be stored in the device's address book.

Figure 5:
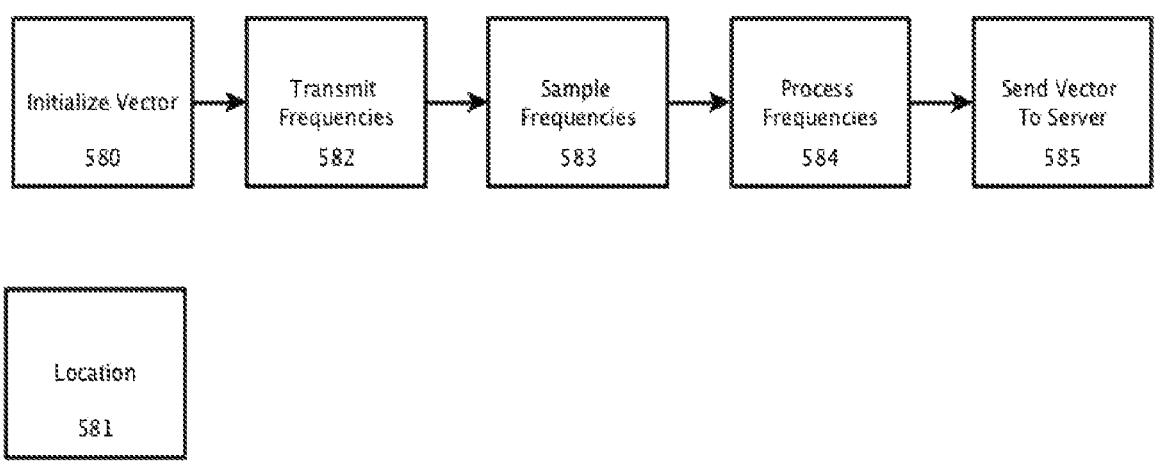
FIG. 5 illustrates building of a frequencies vector according to certain embodiments.

FIG. 5 illustrates an example process of preparing the Vector which gathers all the information to be sent to the server. In box 580 the vector is initialized e.g. all parameters should be zero. Box 581 shows an option to add additional sensors such as the location of the device. Many devices have location services such as GPS that derive the current location of the device. In order to add accuracy to the system this location can be added to the Vector—but this is not mandatory. Other sensors can map Wi-Fi networks that the devices detect, accelerometer movement, compass, and others. This example refers only to Location although the example may apply to other sensors as well.

Box 582 shows initial generation of the Frequency. Typically, the frequency is chosen from predefined slots in the range between Frequency A and B. For example, A may be 18 KHz and B may be defined as 21 KHz. This means there is a range of 3 KHz between them (herein Range). This can be divided e.g. partitioned into, say, 100 slots in which case, if the slots are equal in size, each slot is 3000/100=300 Hz. In this example, the first slot may be 18150 Hz, the second may be 18450 and so on. This is only an example since there can be other parameters. The SDK (say) transmits one or more Frequencies in these predefined slots. For this example the transmitted frequencies may be a and b.

Box 583 shows a process of listening to the Frequencies inside the Range. For this example some device might listen to its own frequencies (a and b) and also to c and d from the other device. Box 584 shows an example method for processing the samples which is a sound file in which the frequencies are part of. By implementing methods such as Fourier transform or other methods, the process distinguishes between the desired Frequencies inside the Range. So by the end of the process, there may be a single number (e.g. 18500) b, c, and d in the same manner.

Box 5855 shows how the vector may be built. In this example the mobile device may send the Data (see above the definition). In the first two fields of the vector there may be frequencies a and b. next there may be c and d. This is just an example e.g. the order can be different, as may the number of frequencies. All this information (as well as the optional data of Location and other sensors if needed) may be sent to the server.

Figure 6:
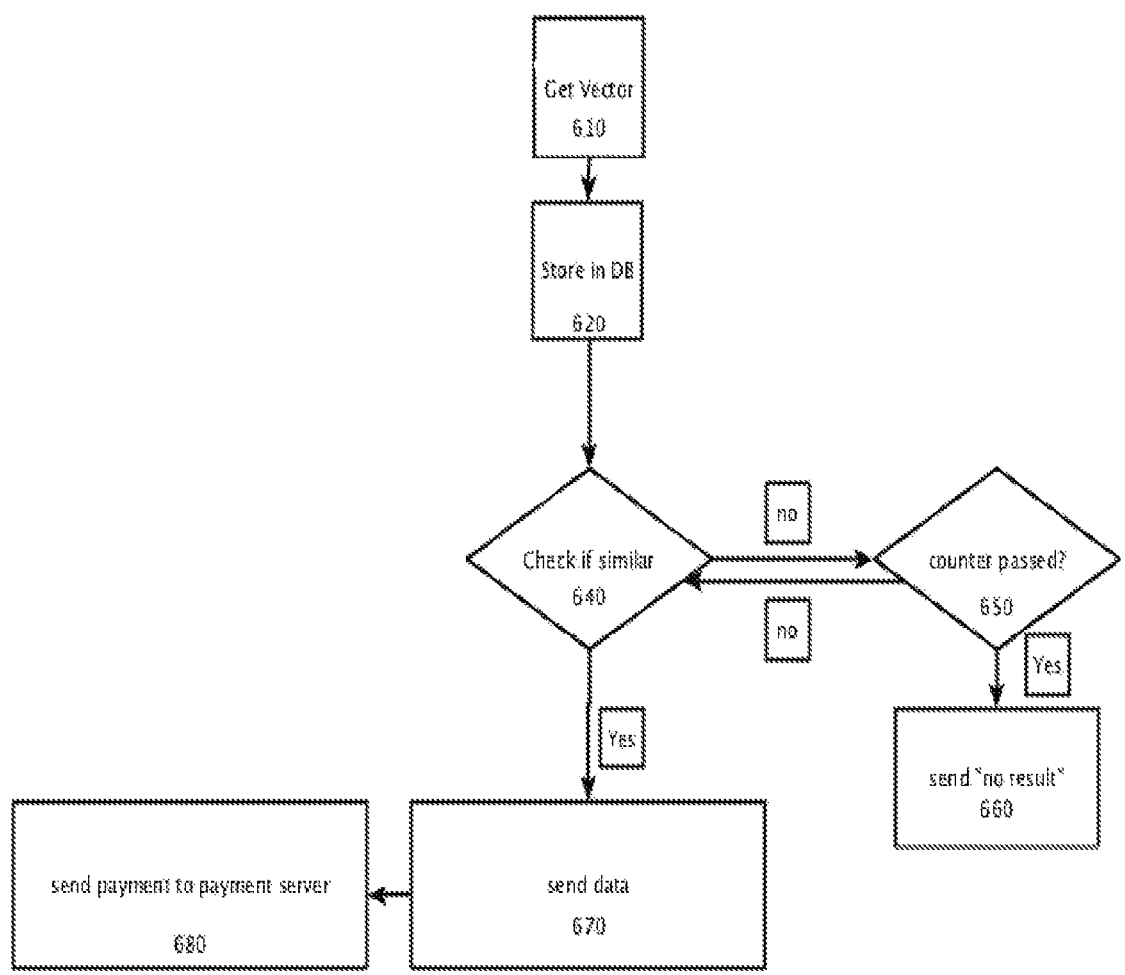
FIG. 6 illustrates a process the server may undergo to find vector similarities.

FIG. 6 depicts a method according to which the Server 550 of FIG. 4 may decide if there is a similarity between two Vectors. Initially the server typically reads the vector (box 610). This vector may be stored temporarily in the Server Database, or in its file system or in its memory (box 620).

In box 630 the server typically finds Correlations with other vectors that are stored already in its memory. The process of finding Correlation is comparing parameters from one vector to all others with certain intervals between them. For instance in the previous example if there is a vector of a,b,c,d and other vector or c,d,a,b there is a similarity. Both numbers from different vectors are typically not exactly the same number. For instance "a" from one vector can be 19001 and "a" from another Vector can be 18999. So there may be a predefined delta (for instance 10) to define what "same number" is. In the last example the two "a" are similar (box 640) because they fall in the range of 10. If other sensors are added to the vector (such as location) they may be compared in the same manner.

A process 630 is optionally operative to determine that only two vectors have the same Correlation. If in the database there is another vector (one or more) with a Correlation, the server might decide that there is a fraud possibility and may send "no result" to the devices. Optionally, if a counter has passed, the server sends "no result" (boxes 650, 660). If a similarity is detected, Box 670 sends the Data, taken from the Vector, back to the other device. This may also be done with the other Vector to the other device. Box 680 is of course optional. In addition to sending back the information, this information can also be stored in external storage.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including at least one processor and/or cooperating input device and/or output device and operative to perform e.g. in software any steps shown and described herein; information storage devices or physical records, such as disks or hard drives, causing at least one computer or other device to be configured so as to carry out any or all of the steps of any of the methods shown and described herein, in any suitable order; at least one program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; at least one processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

Features of the present invention, including method steps, which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including method steps, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the steps illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. Functionalities described or illustrated as systems and sub-units thereof can also be provided as methods and steps therewithin, and functionalities described or illustrated as methods and steps therewithin can also be provided as systems and sub-units thereof. Drawing scale is exemplary and/or for clarity of presentation and not intended to be limiting.

The invention claimed is:

1. A transaction initialization system serving first and second devices, interconnected by a communication network, each having a speaker and a microphone, which wish to perform a transaction, the system comprising:
a server; and
a client which:
controls the first device to initiate the transaction by (a) commanding the first device's speaker to generate a transaction-heralding sound and by (b) notifying the server, via said network, of generation of the transaction-heralding sound;
and controls the second device, using a processor, to notify the server, via said network, that a particular transaction-heralding sound has been heard; and, wherein, at least once, when the server notes that the same transaction-heralding sound has been reported as having been sent and as having been received, the server responsively validates a transaction between the two devices
wherein the transaction-heralding sound is a superposition of n frequencies, wherein the first device randomly selects the n frequencies for different transactions; wherein the second device is arranged to transmit to the server values of frequency peaks received by the second device; and wherein the server notes that the same transaction-heralding sound has been reported as having been sent and as having been received when the n frequencies and the frequency peaks fall within the same frequency bins; and
storing in the first device a credit card number without spreading the credit card number to one or more service providers.

2. A system according to claim 1 wherein the server always validates a transaction between the first and second devices when the server notes that the same transaction-heralding sound has been reported as having been sent by said first device and as having been received by said second device, unless there is reason to invalidate the transaction.

3. A system according to claim 1 wherein each device is controlled by said client to be operative, at least when in active mode, to scan incoming sound in a search for a sound having a known "profile" of a transaction-heralding sound and, each time the device detects an incoming sound that meets the profile, to determine unique parameters identifying said transaction-heralding sound and to convey said parameters to the server.

4. A system according to claim 3 and wherein said parameters comprises n frequency peaks where n is pre-known to the device.

5. A system according to claim 2 wherein said reason comprises a situation in which more than one devices report that their respective speakers have generated the same transaction-heralding sound within a first pre-programmed time interval.

6. A system according to claim 2 wherein said reason comprises a situation in which more than one devices report that their respective microphones have received the same transaction-heralding sound within a second pre-programmed time interval.

7. A system according to claim 2 wherein said reason comprises a situation in which only one device reports generating a particular transaction-heralding sound and only one device reports having received the same transaction-heralding sound, but the 2 reports are separated by a time interval which exceeds a third pre-programmed time interval.

8. A system according to claim 2 wherein each device, when reporting generation/reception of a transaction-heralding sound, provides the server with a pre-assigned app-ID and wherein said reason comprises a situation in which during a certain window of time only one device reports generating a particular transaction-heralding sound and only one device reports having received the same transaction-heralding sound, but the app-IDs of the two devices are not the same.

9. A system according to claim 2 wherein each device, when reporting generation/reception of a transaction-heralding sound, provides the server with a pre-assigned app-ID and wherein said reason comprises a situation in which during a certain window of time only one device reports generating a particular transaction-heralding sound and only one device reports having received the same transaction-heralding sound, but the app-IDs of the two devices do not "match" according to app-ID matching tables accessible to, the server.

10. A system according to claim 1 wherein the first device generates a different transaction-heralding sound for each transaction that the first device wishes to initiate.

11. A system according to claim 1 wherein each transaction-heralding sound typically comprises n superimposed frequencies wherein n is a predetermined integer known to the first and second devices.

12. A system according to claim 11 wherein each frequency is located within one of N slots into which a total spectrum is partitioned.

13. A system according to claim 1 wherein at least one of the first and second devices comprises a web-page.

14. A system according to claim 1 wherein the transaction-heralding sound is within the ultrasonic spectrum.

15. A system according to claim 11 wherein the server is pre-programmed to accept a notification of the n frequencies from the first and second devices.

16. A system according to claim 1 wherein each second device has a standby mode and an active mode and wherein only when in the active mode, the device is operative to scan sound picked up by the second device's microphone in a search for a sound having the known "profile" of a transaction-heralding sound as opposed to at least one of conversations, music and background noise picked up by the second device's microphone which do not meet said profile.

17. A transaction initialization method serving first and second devices, interconnected by a communication network, each having a speaker and a microphone, which wish to perform a transaction, the method comprising:
  providing a client which controls the first device to initiate the transaction including (a) commanding the first device's speaker to generate a transaction-heralding sound and (b) notifying the server, via said network, of generation of the transaction-heralding sound; and which controls the second device, using a processor, to notify the server, via said network, that a particular transaction-heralding sound has been heard;
  and, wherein, at least once, when a server notes that the same transaction-heralding sound has been reported as having been sent and as having been received, the server responsively validates a transaction between the two devices;
  wherein the transaction-heralding sound is a superposition of n frequencies, wherein the first device is randomly selects the n frequencies for different transactions; wherein the second device is arranged to transmit to the server values of frequency peaks received by the second device; and wherein the server notes that the same transaction-heralding sound has been reported as having been sent and as having been received when the n frequencies and the frequency peaks fall within the same frequency bins; and
  storing in the first device a credit card number without spreading the credit card number to one or more service providers.

18. A computer program product, comprising a non-transitory tangible computer readable medium having computer readable program code embodied therein, said computer readable program code adapted to be executed to implement the method of claim 17.

19. A system according to claim 1 wherein the first device stores all data required for certain operations, wherein the data comprises user names and passwords for one or more services.

20. The method according to claim 17 comprising logging into a service, by the first device, without typing, by the user, login information.

* * * * *